United States Patent [19]

Lowrie et al.

[11] Patent Number: 5,027,545
[45] Date of Patent: Jul. 2, 1991

[54] SINKER FOR THE SPORT OF FISHING

[76] Inventors: Todd A. Lowrie, 149 S. Villa, Apt. #2; Paul A. Cannon, 858 Swiftude, Apt. 201; Cecil McGarvey, 149 S. Villa, Apt. #9, all of Addison, Ill. 60101

[21] Appl. No.: 495,646

[22] Filed: Mar. 19, 1990

[51] Int. Cl.$^5$ .......................................... A01K 91/00
[52] U.S. Cl. .................. 43/44.92; 43/43.12; 43/44.97
[58] Field of Search ............... 43/43.12, 44.92, 44.95, 43/44.96, 44.97, 43.15, 43.12, 43.14, 42.36; 24/705, 706.9

[56] References Cited

U.S. PATENT DOCUMENTS

| | | | |
|---|---|---|---|
| 229,080 | 6/1880 | Ballou | 24/705 |
| 279,206 | 6/1883 | Van Altena | 43/43.15 |
| 501,346 | 7/1893 | Homan | 43/43.14 |
| 717,237 | 12/1902 | Marsters . | |
| 1,232,167 | 7/1917 | Arnold | 43/44.92 |
| 1,917,967 | 7/1933 | Green | 43/43.12 |
| 2,162,821 | 6/1939 | Parmenter | 43/49 |
| 2,208,240 | 7/1940 | Arnesen et al. | 43/49 |
| 2,221,437 | 11/1940 | Allison | 43/49 |
| 2,226,331 | 12/1940 | Allison | 43/49 |
| 2,271,899 | 2/1942 | Miller | 43/28 |
| 2,326,510 | 8/1943 | Worden | 43/49 |
| 2,589,715 | 3/1952 | Lysibowski | 43/44.97 |
| 2,654,177 | 10/1953 | Cope et al. | 43/44.88 |
| 2,750,702 | 6/1956 | Hartig | 43/42.36 |
| 3,083,492 | 4/1963 | Kling | 43/44.99 |
| 3,180,052 | 4/1965 | Malesko | 43/44.97 |
| 3,281,983 | 11/1966 | Blankenbecler | 43/43.12 |
| 3,461,597 | 8/1969 | Hobson | 43/44.97 |
| 3,740,803 | 6/1973 | Arteburn | 43/43.12 |
| 3,867,783 | 2/1975 | Simpson | 43/44.91 |
| 3,947,989 | 4/1976 | Bart | 43/43.36 |
| 4,125,958 | 11/1978 | Cote | 43/43.12 |
| 4,750,289 | 6/1988 | Rossa | 43/44.96 |

FOREIGN PATENT DOCUMENTS

| | | | |
|---|---|---|---|
| 42196 | 5/1933 | France | 43/44.92 |
| 909924 | 5/1946 | France | 43/44.92 |
| 2375821 | 9/1978 | France | 43/44.92 |
| 0027317 | of 1904 | United Kingdom | 24/706.9 |

Primary Examiner—Kurt Rowan
Attorney, Agent, or Firm—Milton S. Gerstein; Marvin Benn

[57] ABSTRACT

The present invention relates to a new and useful improvement in the field of sport fishing whereby a sinker that is commonly used for casting purposes is improved upon by allowing the weight component of the sinker to be removed or exchanged for weights of different mass without damage to the line or weight. The invention eliminates the time consuming steps commonly associated with salvaging the fishing line or weight during removal, exchange, and provides an inexpensive releasing device when the sinker becomes irretrievably snagged on a submerged object.

8 Claims, 1 Drawing Sheet

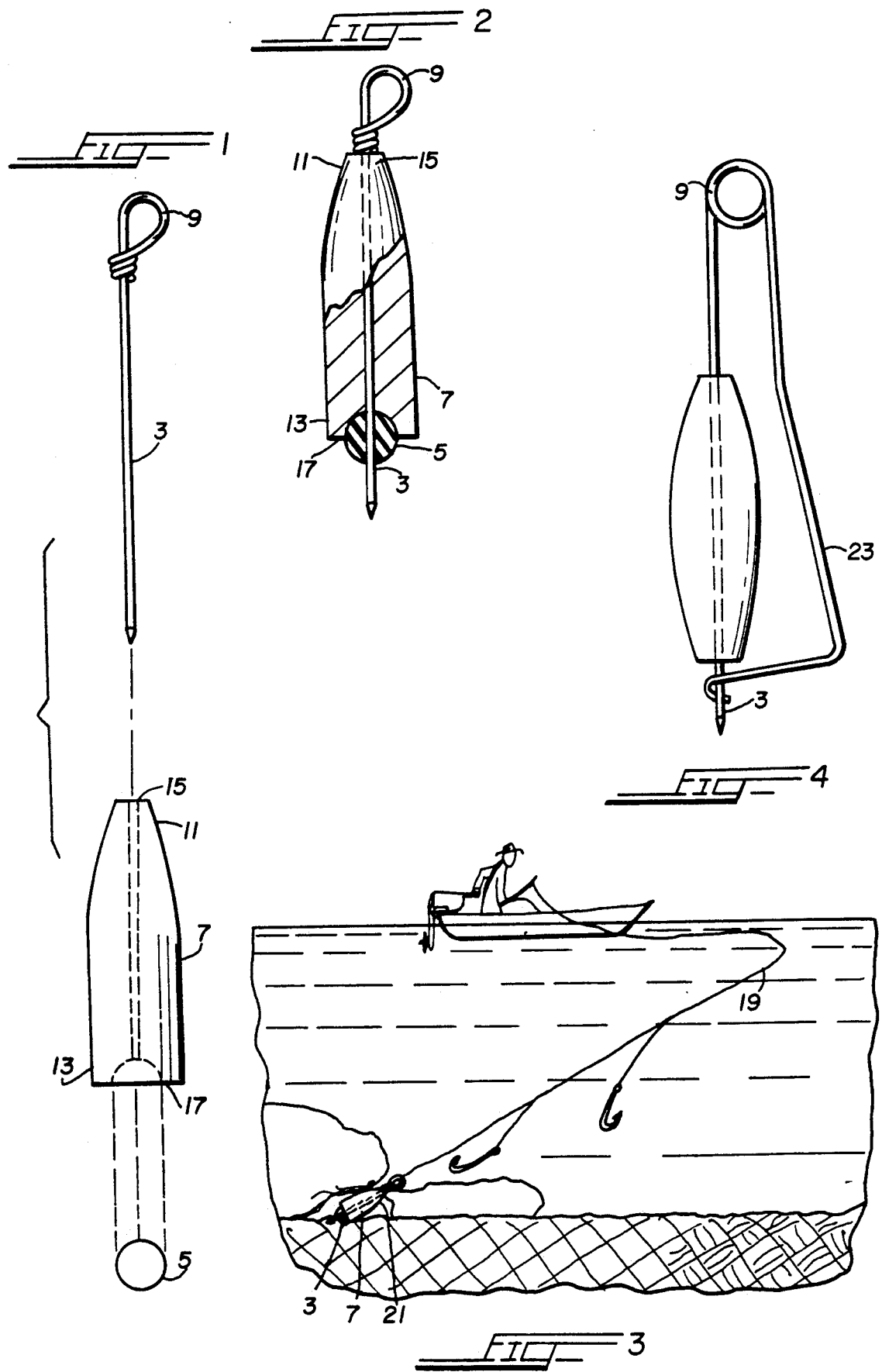

SINKER FOR THE SPORT OF FISHING

BACKGROUND OF THE INVENTION

The present invention relates to the use of sinkers in the field of sport fishing wherein casting is a preferred method for catching fish. In particular, the invention is a reusable sinker that is secured to a fishing line wherein the weight component is readily removable without damage to the fishing line or weight. Thus, the invention eliminates the time consuming steps commonly associated with salvaging a fishing line or sinker when the removal or exchange of a sinker is desired.

Typically, sport fishing utilizes a rod and reel combination for controlling a fishing line with a lure placed at the end of the fishing line to catch fish. The reel stores the fishing line and is used in retrieval of the fishing line. Delivery of the fishing line and lure is accomplished by lowering the lure into a body of water by releasing an amount of fishing line from the reel. Due to the lightweight nature of fishing line, the lure may require additional weight to overcome friction inherent in a reel to sink the lure to a desired depth in water. For this reason it is common to place a weight, usually a small piece of lead, near the lure allowing gravity to sink the lure into the water. The necessity of a weight is further demonstrated when the lure is substituted for live bait, such as minnows, that swim near the surface of the water limiting their effectiveness if not weighted down.

A skill in sport fishing is the ability to determine the correct lure and weight combination. For example, a weight that does not position a lure at the desired water depth must be changed for a heavier weight. A weight that is too heavy does not provide a "feel" in the line when a fish has taken the lure and should be changed to a lighter weight. The importance of weights is most obvious when the lure is pitched a distance from the fisherman's position. This pitching, commonly referred to as casting, requires sufficient weight on the end of the fishing line to overcome air resistance, reel friction, and at the end of the cast be able to sink the lure to the desire water depth. A fishing line with a heavy weight will cause the cast to fall short of its intended location while a light weight may prevent casting of any distance. Variables such as wind direction and existing lure mass present additional factors in determining the correct casting weight. A piece of lead is also commonly used for casting as a weight to overcome the aforementioned casting problems. This lead may be crimped directly to the fishing line or may consist of an eye hook molded into the lead whereby the eye hook is tied to the fishing line.

The current art of sinker design inhibits even the skilled fisherman for the difficultly in removing or changing a sinker is costly in regards to time lost and tackle damage. For example, malleable lead that is crimped directly to a fishing line for a weight may slide off if not crimped correctly and loss of the weight may not be determined until the fishing line is retrieved. If the weight is crimped tightly with a pliers, thereby deforming it, the weight will not slide off but it is not salvageable and requires the line to be cut when removal is desired. Disadvantages of a molded sinker become apparent upon attempt of removal from the fishing line. For instance, if the molded sinker is determined to be the wrong size for current conditions, the exchange of the sinker for one of a different size or type requires the untying of the fishing line from the eye hook or, more practically, the fishing line is cut when removal is desired. Installation of a new weight may now require relocation of the lure due to the cut fishing line. The time consuming task of changing sinkers results in many fisherman utilizing only one sinker with their various lure/bait combinations to avoid this time consuming process. The time element is of a special concern to professional sportsman. The inconvenience caused by the existing art is a concern of all fisherman.

The invention is believed to be a significant improvement in the art of sinkers in that once the present invention is installed, a weight can be exchanged in a minimal of time by simply pulling the current weight component off and substituting a desired weight. The removed weight component is not damaged during the exchange allowing future reuse.

SUMMARY OF THE INVENTION

The present invention relates to a new and useful improvement in the field of sport fishing wherein casting is the preferred method in catching fish. In particular, the invention is a reusable sinker that is secured to a fishing line wherein the weight component is readily removable without damage to the fishing line or weight.

The invention consists of a straight pin, a weight, and a rubber attachment ball. An eye hook is formed at one end of the straight pin for tying the straight pin to a fishing line. The weight consist of malleable lead formed into the shape of a bullet with an opening through the center of the weight, ending in a cavity at the widest end of the weight. The weight is placed upon the straight pin by sliding the straight pin through the center opening way of the weight thereby extending and exposing a portion of the straight pin from the cavity of the weight. The weight is held upon the straight pin by use of a rubber attachment ball placed behind the weight. The rubber attachment ball is pierced by the straight pin providing sufficient compression to prevent slippage from the straight pin.

The cavity further assists during installation for if the rubber attachment ball is first positioned within the cavity, the straight pin can be pushed through the weight thereby centering the pin in the middle of the rubber attachement ball. This facilitates in piercing the center of the rubber attachment ball providing optimum mass for holding. Upon pin removal, the circular shape of the rubber attachment ball in relation to the cavity compresses the rubber attachment ball placing more resistance upon the pin during extraction.

The invention becomes operative when the straight pin is attached to a fishing line by tying it to the fishing line by means of the eye hook. The straight pin is slid through the center of the weight until it protrudes out of the cavity of the weight. The rubber attachment ball is then forced onto the straight pin and into the cavity of the weight thereby restricting the weight's movement between the eye hook and the rubber attachment ball.

Removal of the weight component requires one to grasp the weight and eye-hook with separate hands and pull the weight away from the eye-hook with sufficient force to overcome the rubber attachment ball's gripping ability. Upon removal of the existing weight, a weight of a different size or type may be reinstalled by placing the weight on the straight pin followed by the rubber attachment ball directly behind the weight in a similar installation manner as previously described.

The present invention allows a sinker to be used for "dragging" the bottom of a lake thereby maintaining lures at a set distance above the bottom of the lake. Due to the expense of lures, this effective method of fishing is usually costly in terms of lost tackle for the object dragged across the bottom of the lake is likely to snag upon a submerged object causing complete loss of tackle. Placement of the invention at the end of a fishing line provides an effective dragging device for if the weight becomes snagged, a pull on the fishing line with sufficient strength will remove the straight pin thus saving the fishing line and lure providing an inexpensive releasing device. Only the weight and rubber attachment ball need be replaced while the remaining tackle is salvaged.

The invention allows for the use of a modified straight pin in place of the rubber attachment ball. In this mode a portion of the straight pin encompasses the weight and hooks the straight pin beneath the weight. Removal of the weight requires the encompassing portion of the pin to be unhooked from beneath the weight allowing the weight to slide off the straight pin.

An object of the present invention is to provide a new and improved sinker that is easily removed with minimal time and without damage to the fishing line.

Another object of the invention is to provide a new and improved sinker that permits an exchange of weight type or size without damage to the sinker allowing infinite reuse.

Still another object of the present invention is to prevent the loss of fishing line and lure by release of the sinker weight when the weight is irretrievably snagged beneath the water.

These together with other objects will be apparent as further described in the detailed description of the embodiment.

DESCRIPTION OF THE DRAWINGS

FIG. 1 is a side elevation view of the invention with the individual components separated;

FIG. 2 is a side elevation view of the invention with the individual components connected;

FIG. 3 is a perspective view of the invention illustrating its use;

FIG. 4 is a side elevation view of the invention with a hook pin.

DETAILED DESCRIPTION OF THE INVENTION

Referring to FIG. 1, the invention consists of a straight pin 3, a rubber attachment ball 5, and a weight 7. An eye hook 9 is formed at one end of the straight pin by shaping a portion of the pin into a circular loop and securing the loop by twisting a section of the eye-hook around the straight pin for rigidity. The straight pin is sized for universal applications with a length approximately between 1 and 1.5 inches, a diameter of 1/32 inches, and brass construction.

The weight consists of malleable lead formed in the shape of a bullet with a narrow point 11 at one end and a wider breadth 13 at the opposite end. An opening 15 is placed through the center of the weight that is slightly larger than the straight pin diameter beginning at the narrow end of the weight and ending in a cavity 17 at the wider end of the weight. The weight is placed upon the straight pin by sliding the straight pin through the passageway of the weight and extending a portion of the straight pin out the cavity at the wide end of the weight. It should be noted that the cavity exposes a section of the straight pin as it extends through the cavity.

In FIG. 2, the weight is held upon the straight pin 3 by use of the rubber attachment ball 5 which is placed behind the weight 7. The rubber attachment ball is made from a single piece of material, preferably rubber, that can be pierced by the straight pin yet provide sufficient compression to prevent slippage of the straight pin. The shape of the rubber attachment ball allows it be positioned within the cavity of the weight to prevent accidental removal, and by means of the shape of the cavity, provide additional compression, further securing the straight pin.

The rubber attachment ball can be placed within the cavity before the straight pin is placed through the weight, assisting in installation for once the rubber attachment ball is positioned within the cavity, the straight pin is pushed through the weight centering the pin in the middle of the rubber attachment ball. By piercing the middle of the rubber attachment ball, the maximum amount of mass is utilized to prevent slippage of the straight pin.

Removal of the weight requires one to grasp the eye-hook and weight with separate hands and pull with sufficient strength to overcome the rubber attachment ball's grip. The exchange of a weight of one of larger or smaller size can also be accomplished by simply removing the weight and placing a new weight of appropriate size or type in its place.

Referring to FIG. 3, the invention is shown in position on a fishing line 19 where the device 21 is used to prevent loss of tackle if the weight becomes snagged by a submerged object. The fishing line has lures attached, and the invention is positioned at the end of the fishing line. When the invention is used for dragging on the lake bottom, if the weight becomes snagged, a pull on the fishing line with sufficient strength will remove the straight pin 3 from the weight 7. The weight and rubber attachment ball is replaced while the fishing line and lure/bait combination is salvaged.

FIG. 4 is a variation of the invention, whereby the rubber attachment ball is replaced by a modification of the straight pin. The portion of the straight pin 3 that forms the eye-hook 9 is continued and extends into an encompassing portion 23 which is wrapped around the weight and hooked over the extending portion beneath the weight.

The structure shown and described herein is capable of considerable changes and modifications from time to time by those skilled in the art, and such changes and modifications as may be resorted to which fall within the spirit and intent of the invention any also be considered a falling within the scope of the appended claims.

What is claimed is:

1. A sinker for a fishing line comprising:
   a line attachment pin;
   a weight element comprising a longitudinal opening therethrough, said longitudinal opening having an entrance and an exit, said longitudinal opening extending substantially entirely through said weight element;
   an attachment means for releasably securing said pin and said weight element together;
   said pin further comprising a first end and a second pointed-tip end, said first end comprising a means for securing said pin to a fishing line and said second end being slidably received in and extending completely through said weight element's longitudinal opening, said second pointed-tip end of said pin projecting outwardly from said exit of said longitudinal opening of said weight element, said attachment means maintaining said weight element on said pin by means of the forced insertion of said second end therein;

said attachment means comprising a compressive member made of rubber-like material for piercingly receiving therethrough said pointed-tip end of said pin, said compressive member being positioned exteriorly of and adjacent to said exit of said longitudinal opening, whereby said pin may be readily removed from said compressive member upon the pulling thereof by a fishing line secured to said pin via said first end of said pin.

2. The sinker according to claim 1, wherein said pin is approximately between 1 and 1.5 inches in length.

3. The sinker according to claim 1, wherein said means for securing comprises an eye-hook for securing said pin to a fishing line.

4. The sinker according to claim 1, wherein said weight element comprises a first end and a second end, said exit comprising a cavity having a shape corresponding to the shape of said compressive member.

5. The sinker according to claim 4, wherein said weight element is elongated with a narrow portion at said first end and a wider portion at said second end.

6. The sinker according to claim 4, wherein said cavity retains said attachment means upon removal of said pin.

7. A sinker according to claim 1, wherein said compressible member is made of a material capable of being pierced repeatedly by said pointed tip-end of said pin.

8. The sinker according to claim 1, wherein said compressive member is made of rubber.

* * * * *